(12) United States Patent
Hardee et al.

(10) Patent No.: US 9,861,894 B2
(45) Date of Patent: Jan. 9, 2018

(54) DYNAMIC PERSONALIZED LOCATION AND CONTACT-AWARE GAMES

(71) Applicant: International Business Machines Corporation, Armonk, NY (US)

(72) Inventors: Christopher J. Hardee, Raleigh, NC (US); Steven R. Joroff, Rivervale, NJ (US); Pamela A. Nesbitt, Ridgefield, CT (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 14/869,050

(22) Filed: Sep. 29, 2015

(65) Prior Publication Data

US 2017/0087469 A1 Mar. 30, 2017

(51) Int. Cl.
*A63F 13/67* (2014.01)
*A63F 13/77* (2014.01)
*A63F 13/217* (2014.01)
*G07F 17/32* (2006.01)

(52) U.S. Cl.
CPC ............ *A63F 13/67* (2014.09); *A63F 13/217* (2014.09); *A63F 13/77* (2014.09); *G07F 17/3227* (2013.01)

(58) Field of Classification Search
None
See application file for complete search history.

(56) References Cited

U.S. PATENT DOCUMENTS

| 8,556,715 | B2 | 10/2013 | Archer et al. | |
|---|---|---|---|---|
| 2007/0197274 | A1* | 8/2007 | Dugan | A63F 13/52 463/7 |
| 2011/0300925 | A1* | 12/2011 | Adiraju | G07F 17/32 463/25 |
| 2012/0231887 | A1* | 9/2012 | Lee | A63F 13/65 463/39 |
| 2013/0079132 | A1* | 3/2013 | Archer | A63F 13/79 463/31 |

OTHER PUBLICATIONS

Atari, "Work Out, Earn Points, Play Games !," Atari Fit, p. 1-6, Atari Interactive, http://www.atarifit.com/, Accessed on Sep. 24, 2015.

(Continued)

*Primary Examiner* — Milap Shah
*Assistant Examiner* — Robert T Clarke, Jr.
(74) *Attorney, Agent, or Firm* — Robert C. Bunker (57) ABSTRACT

According to one exemplary embodiment, a method for personalizing a game executed by an electronic device is provided. The method may include collecting a plurality of user data. The method may also include determining at least one input/output option. The method may then include selecting a game template from a plurality of available game templates based on the collected plurality of user data and the determined at least one input/output option. The method may further include configuring the electronic game based on the selected game template, the collected plurality of user data, and the determined plurality of input/output options. The method may also include executing, by the electronic device, the configured electronic game.

20 Claims, 6 Drawing Sheets

(56) References Cited

OTHER PUBLICATIONS

Donahoe, "OnTheRun: A Location-based Exercise Game," Massachusetts Institute of Technology Thesis, Sep. 2011, p. 1-59.
Kamel Boulos et al., "Exergames for health and fitness: the roles of GPS and geosocial apps," International Journal of Health Geographics, 2013, p. 1-7, vol. 12, Issue 18.
Kuehn et al., "Design and Implementation of Location and Situation Based Services for a Pervasive Mobile Adventure Game," IEEE International Workshop on Intelligent Data Acquisition and Advanced Computing Systems: Technology and Applications, Sep. 21-23, 2009, p. 640-644, IEEE, Rende (Cosenza), Italy.
Macvean et al., "iFitQuest: A School Based Study of a Mobile Location-Aware Exergame for Adolescents," MobileHCI'12, Sep. 21-24, 2012, 10 Pages, ACM, San Francisco, CA, USA.
Mell et al., "The NIST Definition of Cloud Computing," National Institute of Standards and Technology, Sep. 2011, p. 1-3, Special Publication 800-145.
Shanklin, "Bored with exercise machines? One day Oculus Rift could spice things up," Gizmag—Wearable Electronics, Dec. 30, 2014, p. 1-5, http://www.gizmag.com/oculus-rift-gear-vr-virtual-reality-exercise/35394/, Accessed on Sep. 24, 2015.
Six to Start et al., "Run in the Real World. Become a Hero in Another.," Zombies, Run!, p. 1-7, https://zombiesrungame.com/, Accessed on Sep. 24, 2015.
Wire News, "A game fitness app motivates players with 150 exercise routines," The Mercury—Lifestyle, Dec. 30, 2014, p. 1-2, http://www.pottsmerc.com/lifestyle/20141230/a-game-fitness-app-motivates-players-with-150-exercise-routines, Accessed on Sep. 24, 2015.

\* cited by examiner

DYNAMIC PERSONALIZED LOCATION AND CONTACT-AWARE GAMES

BACKGROUND

The present invention relates generally to the field of computing, and more particularly to personalized electronic games.

Electronic gaming (i.e., video games) has become an important, profitable industry and often relies on leveraging current technology to provide unique gaming experiences that will attract and entertain players. Additionally, gaming may provide players with opportunities to experience a different persona and the gaming experience may also be used as a vehicle for achieving exercise-oriented goals.

SUMMARY

According to one exemplary embodiment, a method for personalizing a game executed by an electronic device is provided. The method may include collecting a plurality of user data. The method may also include determining at least one input/output option. The method may then include selecting a game template from a plurality of available game templates based on the collected plurality of user data and the determined at least one input/output option. The method may further include configuring the electronic game based on the selected game template, the collected plurality of user data, and the determined plurality of input/output options. The method may also include executing, by the electronic device, the configured electronic game.

According to another exemplary embodiment, a computer system for personalizing a game executed by an electronic device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include collecting a plurality of user data. The method may also include determining at least one input/output option. The method may then include selecting a game template from a plurality of available game templates based on the collected plurality of user data and the determined at least one input/output option. The method may further include configuring the electronic game based on the selected game template, the collected plurality of user data, and the determined plurality of input/output options. The method may also include executing, by the electronic device, the configured electronic game.

According to yet another exemplary embodiment, a computer program product for personalizing a game executed by an electronic device is provided. The computer program product may include one or more computer-readable storage devices and program instructions stored on at least one of the one or more tangible storage devices, the program instructions executable by a processor. The computer program product may include program instructions to collect a plurality of user data. The computer program product may also include program instructions to determine at least one input/output option. The computer program product may then include program instructions to select a game template from a plurality of available game templates based on the collected plurality of user data and the determined at least one input/output option. The computer program product may further include program instructions to configure the electronic game based on the selected game template, the collected plurality of user data, and the determined plurality of input/output options. The computer program product may then include program instructions to execute, by the electronic device, the configured electronic game.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for a dynamic personalized electronic game that is location and contact-aware. As such, the present embodiment has the capacity to improve the technical field of electronic gaming by making electronic games dynamic and personalized to the player. More specifically, a player's contacts (e.g., friends and family), input/output options associated with personal electronic devices, and the features of the geographical around the location the player is at may be leveraged to create a dynamic and personalized electronic game for the player.

As described previously, Electronic gaming (i.e., video games) has become an important, profitable industry and often relies on leveraging emerging technology to provide unique gaming experiences that will attract and entertain players. Additionally, gaming may provide players with opportunities to experience a different persona and the gaming experience may also be used as a vehicle for achieving educational or exercise-oriented goals. However, many games may lack personalization and may not dynamically change to be better fit the player's preferences and abilities, thus the game may not capture the interest of some potential players.

Therefore, it may be advantageous to, among other things, provide a way to make computer games more appealing by allowing more personalization and by dynamically incorporating a player's surroundings and/or personal contacts.

Dynamic games that integrate themselves into a player's life in a personalized way may generate more player interest and enthusiasm. Games may dynamically integrate into a player's life by, for example, incorporating the player's personal contacts, interests, preferred level of activity, age and demographics, medical history, global positioning system (GPS) coordinates, elevation based on an altimeter, movement based on an accelerometer, camera data, etc. Such information may be obtained from personal electronic devices that a person may already use such as a smartphone, wearable technology (e.g., fitness tracker), etc. The player's personal electronic device may be accessed to determine the player's personal contacts, most frequently contacted contacts, interests like sports and activities, and calendar entries that may be used to customize the game to the person and more readily integrate the game with the player's life appropriately. Additional publicly available information may also be gathered, such as building blueprints for a structure the player is in or may be passing by soon, nature trail maps, etc. to determine physical objects (e.g., building) that may be in the user's environment that may be used by the game for a game setting and/or for user interaction.

According to at least one embodiment, personal information, publically available information, sensors and positional data (e.g., GPS location, altimeter, accelerometer, etc.) from a person's personal electronic device, and user-defined preferences may be collected and used to create a personalized dynamic game for the player that may appropriately fit into the player's schedule. The present embodiment may provide a short challenging game that may be tailored to the player to make the gaming experience more interesting.

The present embodiment may run on the user's electronic device (e.g., smartphone) with an optional server-side component for offsite backup and additional processing power or storage for voluminous data sets.

According to at least one embodiment, the user may fill out a profile that indicates personal information about the user/player, such as name, age, preferences (times of day the user may be interrupted for a game, exclude stairs, avoid getting sweaty while at work, etc.), user status (e.g., college the user attends and major, or job and job type, etc.), social sites (e.g., Facebook), lists of family and friends as well as people the user would prefer to avoid. In the case of an exercise-oriented game (i.e., exergame), current fitness level and desired goals, and data regarding preferred methods of exercise (e.g., running, bicycling, etc.) may also be collected.

After the user has generated a profile or otherwise indicated preferences, the personal information and preferences may be analyzed, and supplemental information obtained, to choose a personalized game experience for the user. The user's contacts may be searched and the methods the user employs as well as frequency of contact may be determined. Publically available blueprints, building layouts, maps, etc. may be searched for game use. Additionally, local landmarks, bus and train schedules, and other location-specific data may be gathered regarding the user's current location or predicted future location. With the user's consent, the user's social media sites, texts on the user's smartphone, and other content of relevance may be gathered to create a personalized game for the user.

Then, the output options may also be assessed. For instance, output options may include virtual reality glasses, a smartphone screen, audio output, haptics (e.g., force feedback), etc. Thereafter, an appropriate game template may be selected from available game templates based on the user's preferences, age, location, fitness level, goals, etc. of the user.

A game may then be generated using the template and the user's preferences and collected supplemental information and output to the user using the determined available outputs. Furthermore, after the user has played the game, friends and other contacts may optionally receive a message indicating the user's success in playing the game.

Figure 1:
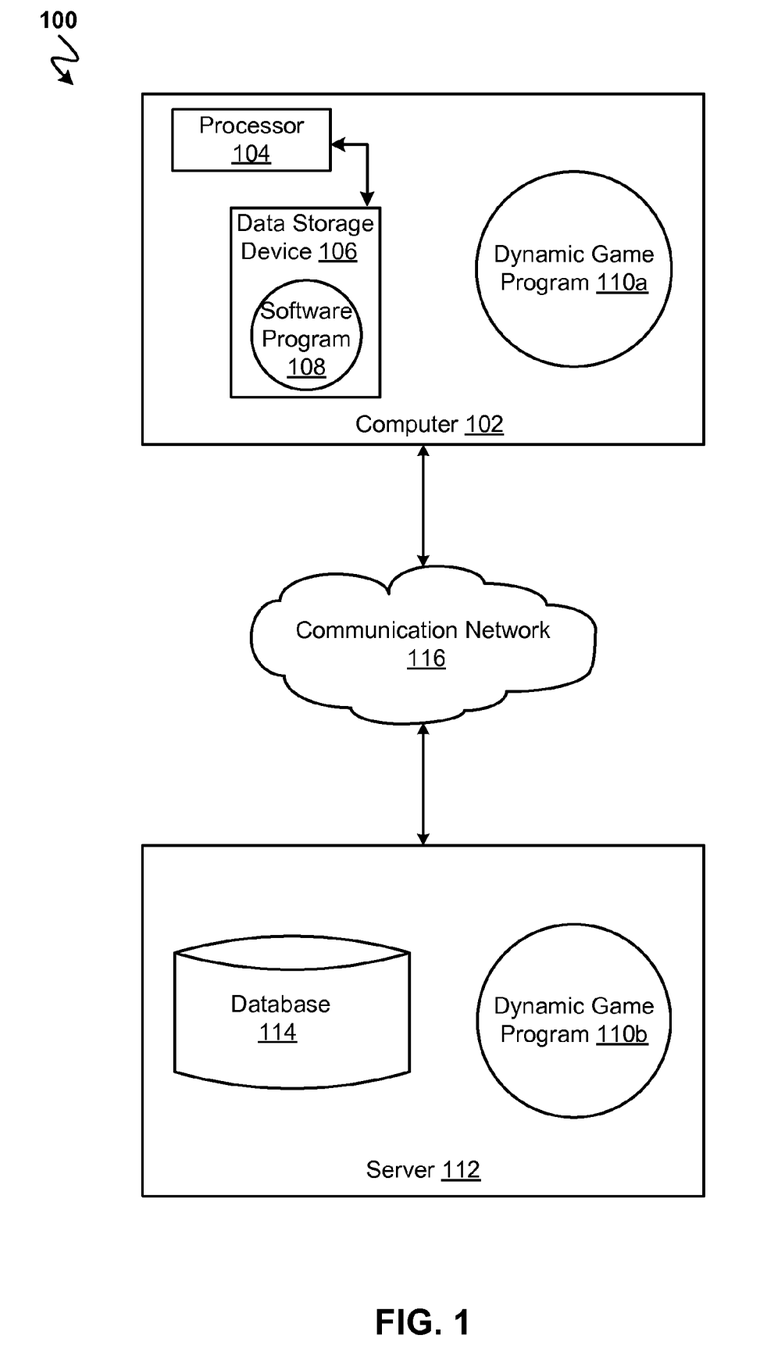
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic game program 110a. The networked computer environment 100 may also include a server 112 that is enabled to run a dynamic game program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic game program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic game program 110a, 110b (respectively) to provide a personalized dynamic gaming experience for players. The dynamic game method is explained in more detail below with respect to FIGS. 2 and 3.

Figure 2:
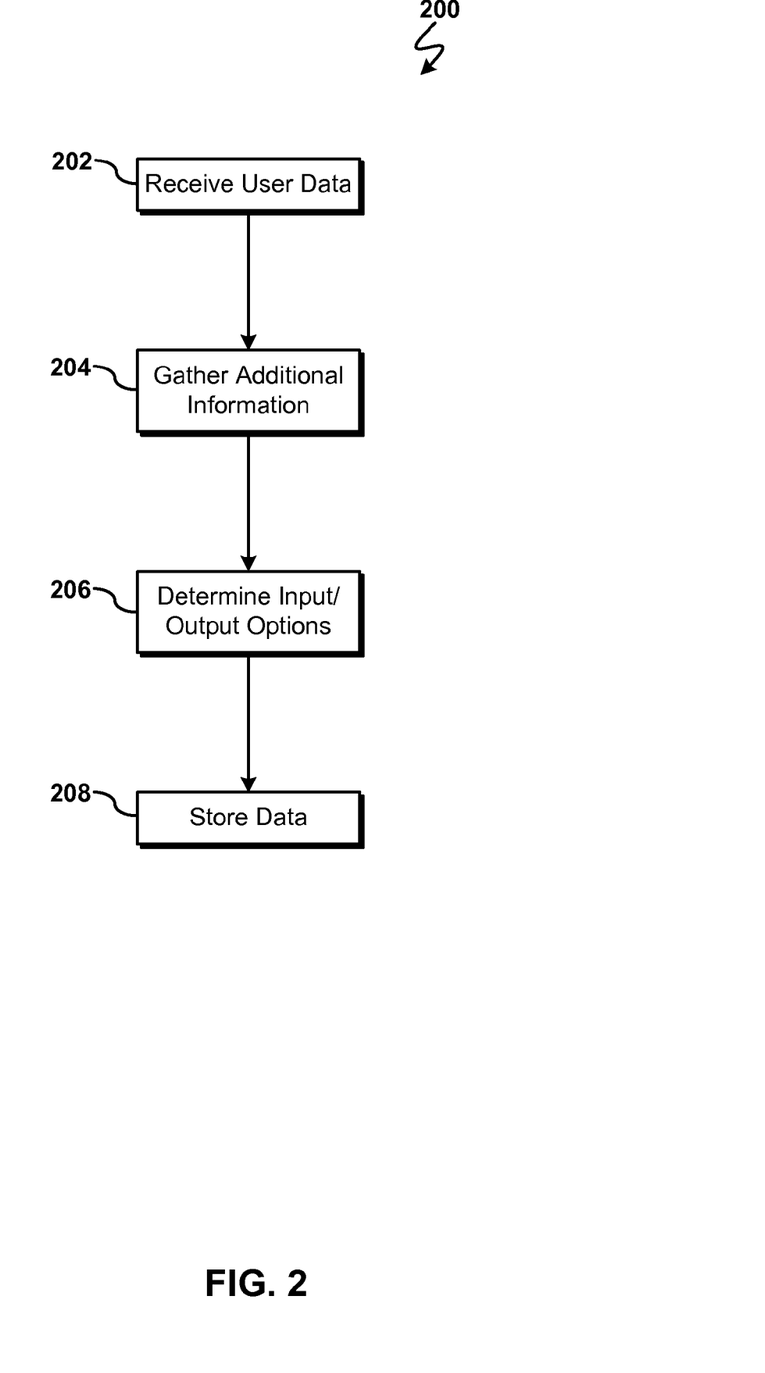
FIG. 2 is an operational flow chart illustrating a preparation process according to at least one embodiment.

Referring now to FIG. 2, an operational flow chart illustrating the exemplary preparation process 200 used by the dynamic game program 110a and 110b (FIG. 1) according to at least one embodiment is depicted.

At 202 user data is received. According to at least one embodiment, relevant user data is received for use in personalizing a game for the user (i.e., player) may be obtained from user input. For example, the user may be presented with a graphical user interface (GUI) frontend on the user's smartphone providing the user with various input fields to indicate user data and preferences. The user may indicate contacts, age and demographics, interests (e.g., sports), game preferences (e.g., games where the player is a hero, a post-apocalyptic setting, etc.), preferred level of activity, social media profiles, etc. Additionally, the user may indicate trigger criteria for starting a game, such as certain times of days (e.g., Saturday afternoons), locations (e.g., when travelling home after class), personal objectives (e.g., have a higher score than the user's friends, therefore the user may be prompted to play if a friends achieved a new high score in a game), and, in the case of an exergame, fitness goals/objectives (e.g., if the player has not reached their daily goal for calories burned, an exergame may be triggered to help the player achieve their goal) and preferences, etc. The user may also indicate a combination of trigger criteria (e.g., at X time while at Y location).

Next, at 204, additional information relating to the user is gathered. According to at least one embodiment, the user's phone (or other sources, such as social media sties, etc.) may be mined for additional data relevant to personalizing a game based on user consent. Additional mined data may include searching for contacts (if they were not input by the user previously) and searching for how the user contacts their contacts and how frequently (e.g., to determine if the contact is a close friend), searching the user's calendar or social media profile to determine where the user frequently goes (to determine which geographical areas should be searched for useful features to use in a game) and what activities the user frequently participates in (that may be used to select a game template that relates to a frequent activity the user already engages in to make the game more convenient and potentially more interesting).

Then, at 206, input/output options may be determined. According to at least one embodiment, possible input/output methods may be determined and store for later use. For example, if the user accesses the dynamic game program 110a and 110b (FIG. 1) on their smartphone, the smartphone's capabilities (e.g., screen, haptics, speaker/audio out, etc.) may be queried and determined. Additionally, the smartphone (or other electronic device) may be queried for additional electronic devices (e.g., virtual reality glasses, fitness tracker, Bluetooth headphones, etc.) that the smartphone is connected to by wire or wirelessly (e.g., Bluetooth). According to at least one other embodiment, the user may also expressly indicate what other input/output options may be available.

At 208, the collected data from 202, 204, and 206 is stored for later use. According to at least one embodiment, the data may be stored by the dynamic game program 110a and 110b (FIG. 1) on the user's personal electronic device in a data repository, such as a data storage device 106 (FIG. 1). According to at least one other embodiment, the data may be stored remotely in a server 112 (FIG. 1) where the data may be accessed by different user devices (e.g., tablet, second smartphone, etc.). Additionally, the storage server 112 (FIG. 1) may collect data regarding emerging trends (e.g., a new type of game is quickly becoming popular based on social media site postings).

Figure 3:
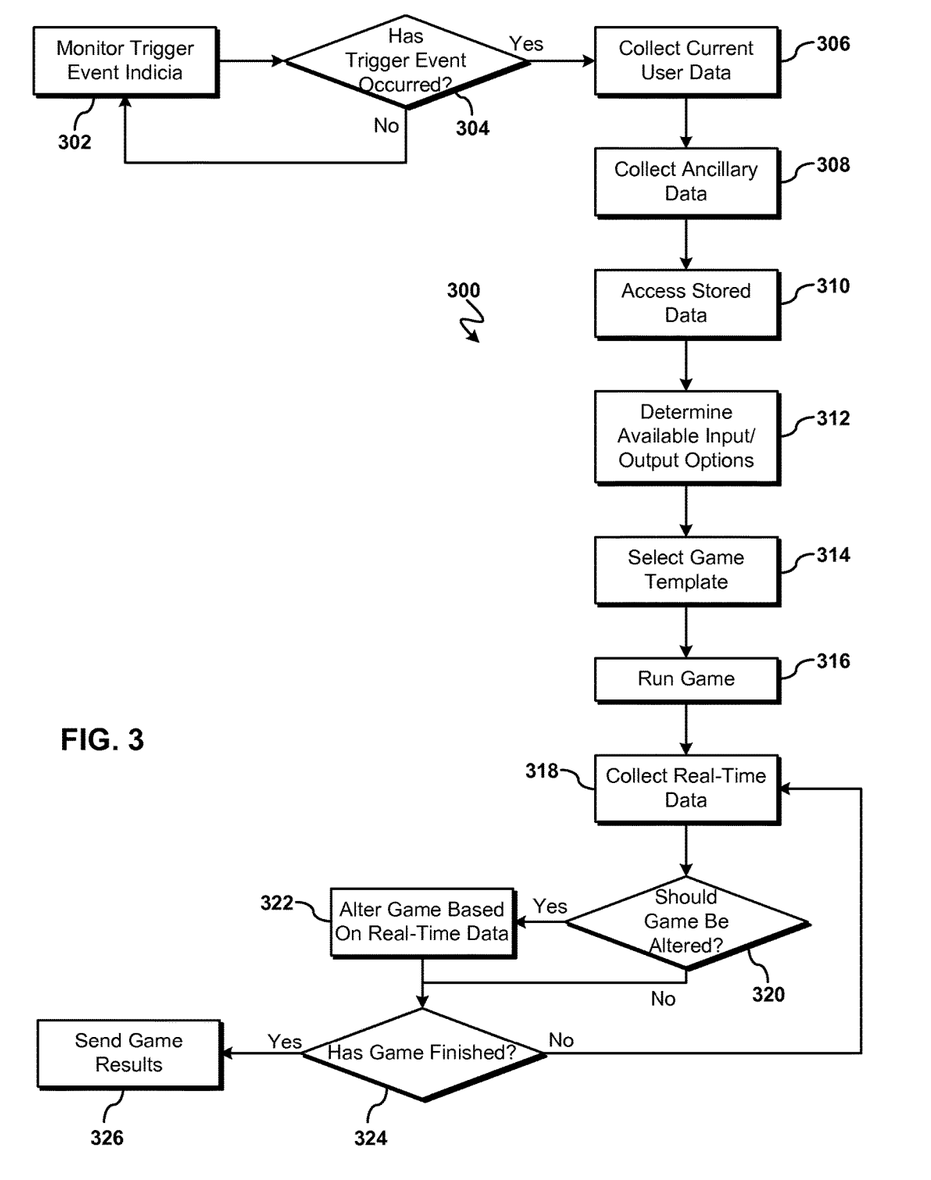
FIG. 3 is an operational flow chart illustrating a run-time process according to at least one embodiment.

Referring now to FIG. 3, an operational flow chart illustrating the exemplary run-time process 300 used by the dynamic game program 110a and 110b (FIG. 1) according to at least one embodiment is depicted.

At 302, trigger event indicia is monitored. According to at least one embodiment, the user-supplied trigger criteria received by the preparation process 200 (FIG. 2) at 202 (FIG. 2) and recorded at 208 (FIG. 2) may be used to monitor trigger event indicia. The trigger criteria recorded at 208 (FIG. 2) may be accessed to read the user's preferences. For example, if, after accessing the stored user preferences, the user's trigger criteria indicates that the user would want to play a game in the evening while travelling home from work, the time may be monitored to later determine if the user has finished work and the location (e.g., via GPS) of the user at that time to later determine if the user is travelling home from work (e.g., tracking the movement of the user from the location where they work towards where they live).

Next, at 304, it is determined if a trigger event has occurred. According to at least one embodiment, if the user's trigger criteria is met, it is determined that the trigger event as occurred. For example, if the user indicated that the trigger criteria is between 5:00 p.m. and 6:00 p.m. when the user is at their college's campus, a trigger event may be determined to have occurred if the current time is queried to be between 5:00 p.m. and 6:00 p.m. (e.g., 5:43 p.m.) and the user's GPS coordinates indicate that the user is on their college's campus.

If it is determined that the trigger event has not occurred at 304, the run-time process 300 will return to 302 to continue to monitor trigger event indicia.

However, if it is determined that the trigger even has occurred at 304, the user's current data is collected at 306. According to at least one embodiment, current data about the user may be collected regarding the user's current position (e.g., GPS position, altitude via altimeter, movement via accelerometer) and state (e.g., heart rate via fitness tracker).

Next, at 308, ancillary data is collected. According to at least one embodiment, additional relevant data may be gathered based on the user's current position (as determined at 306). Additional relevant data may include local landmarks, public transportation (e.g., bus routes), building floorplans, or other information that may be useful for creating a personalized game experience.

Then, at 310, the data previously stored at 208 (FIG. 2) is accessed to retrieve the user's preferences and other data. According to at least one embodiment, the user's preferences (e.g., age, preferred game types/settings, etc.) and other data stored (e.g., emerging trends for popular games) in the server 112 (FIG. 1) may be accessed to be used to generate a personalized gaming experience for the user.

At 312, currently available input/output options are determined. According to at least one embodiment, input/output options that could be used by a game are determined based on what input/output options are available to the user. Possible input/output options may have already been determined at 206 (FIG. 2) based on what the user may have indicated and/or automatic querying that may allow for more efficient determination of what input/output options are currently available for gaming use. Input/output options may be determined from querying the electronic device the user is carrying (e.g., smartphone) for the electronic device's current input/output capabilities and for additional connected devices (e.g., fitness tracker actively connected to the smartphone via Bluetooth) that may provide more input/output options. For example, while the user may have indicated previously that the user owns a fitness tracker with a heartrate sensor as a possible input, the user may not have remembered to put their fitness tracker on before leaving home and thus the heartrate sensor may not be an available input option.

Next, at 314, a game template is selected based on accumulated data. According to at least one embodiment, a library of game templates may be downloaded to the electronic device (e.g., smartphone) executing the run-time process 300. According to at least one other embodiment, the library of templates may be filtered before downloading to exclude templates that may not fit the user's preferences.

From the library of available game templates, the user's preferences, location data (e.g., building floorplans), available input/output options, and other relevant data may be used to select a game template for the user to play. Game templates may provide the game structure and goals as well as indicate any required and optional inputs/outputs the game may use. A template may be selected based on matching the available input/output options to the ones the template calls for as well as incorporating physical features the game would need (e.g., stairs). Furthermore, the game template may be selected based on the user's preferences (e.g., not wanting to sweat while at work). A game template may then be selected by matching the game template's requirements with the data collected.

According to at least one embodiment, a pool of potential game templates may be generated that most closely match the current data and user preferences and each game template may be ranked with the closest match being chosen. According to at least one other embodiment, a pool of game template matches may be generated and ranked and the ranked game templates may be presented to the user to select a game template the user wishes to utilize for a game.

For example, a user may indicate that he is 18 years old, in college, and has a girlfriend with whom he sends text messages frequently. The user may also indicate that he has fitness goals and prefers having a game where he can play as a hero. Current data collected may indicate that the user is near a building at his school with five flights of stairs. Additionally, the user has a smartphone carried with him and a fitness tracker on his wrist that is actively connected to his smartphone. Out of a library of available game templates, game template GT may be selected that has the player act as a hero, requires four or more flights of stairs, requires at least a smartphone for input/output and optionally uses a fitness tracker to read heartrate, and may optionally send a close contact the results of the game. Since game template GT fits the user's current situation (i.e., user preferences and the template's requirements are met), GT may be selected as the basis for a game for the user.

Then, at 316, a game is run (i.e., executed) based on the game template selected at 314. According to at least one embodiment, the selected game template may be used along with collected data and available input/output options to populate the game template (i.e., generate the game) and run the game. Based on the collected data and available input/output options, the game's content, behavior, and presentation may be altered to fit the user's preferences and gaming environment (e.g., location).

Continuing the example of game template GT, the game template may be populated using the current data collected. GT may describe a game where the user is a hero with a game objective to climb stairs to the top of a building to rescue a fictional person from harm due to a fictional fire. The game template GT may be populated to fit the user, such as making the user the hero, assigning the identity of one of the user's contacts as the person needing rescue, and using a building on the college campus that the user attends as the building with stairs the user needs to climb to rescue the person threatened by the fire in the fictional game scenario. Game template GT, may further be configured to include input options that may be monitored, such as a smartphone screen and GPS location, as well as output options, such as the smartphone screen, audio output, and haptics. Thus, the content of the game (e.g., rescue target, hero) and the presentation of the game (i.e., the game output, location where the game will be played) may be altered based on the data collected. Furthermore, the behavior of the game in regards to input/output may be altered to convey the game to the user based on the available input/output options.

Additionally, based on the game template, output may be sent to the user as the game is run to initiate the game (e.g., output to the user's smartphone screen or virtual reality glasses with the game scenario, rules, and objective).

As the user plays the game, real-time data is collected at 318. According to at least one embodiment, the inputs the game uses may monitored for real-time feedback (e.g., heartrate, changing GPS coordinates, etc.) to determine how the player (i.e., user) is progressing in the game and to potentially alter the behavior of the game. For example, the game template may indicate that the player's heartrate, altitude, and location may be monitored as inputs.

At 320, it is determined if the game should be altered based on the real-time data collected at 318. According to at least one embodiment, it may be determined if a player is having trouble progressing through the game, progressing too easily through the game, or if the player has reacted to a game objective (e.g., determining is the player responded to an in-game alert to stop climbing stairs at the third floor and run to laundry room for bonus points). For example, if the player is does not reach a checkpoint in the game at a threshold time (e.g., climb to the third floor within two minutes), it may be determined that the player may be progressing too slowly through the game.

If it is determined that the game should be altered at 320, the game is altered based on the real-time data at 322. According to at least one embodiment, the game's behavior may be altered based on the real-time data to change the game scenario (e.g., output may be sent to the player's smartphone to alert the player that the fictional people chasing the player have blocked the current path to the finishing point and that the player must make a detour if the player is progressing too slow).

However, if it is determined that the game should not be altered at 320, or if the game was altered based on real-time data at 322, it is determined if the game has finished at 324. According to at least one embodiment, when the game template is selected and populated with current information (e.g., local buildings), game's objective may be determined (e.g., reach a certain GPS position within a time limit). Based on the game's objective, it may be determined if the player has satisfied the objective (e.g., reached the objective location within the time limit) or failed (time ran out before the player satisfied the objective).

If it is determined that the game has not finished at 324 (i.e., the game's objective has not been completed or failed), the game may continue to run and return to collect more real-time data at 318.

However, if it was determined that the game has finished at 324, the game results may be sent out or saved to a target destination at 326. According to at least one embodiment, game results may be sent to the player's friends or other contacts as part of the game experience (e.g., sending a text message to the player's girlfriend indicating that the player saved her in the fictional game scenario since the player completed the game's objective), and/or the results may be saved for later comparison (e.g., with the player's future attempts or with other friend's results) or to influence future game selections (e.g., after the user gives feedback on whether or not the player liked that game).

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

Figure 4:
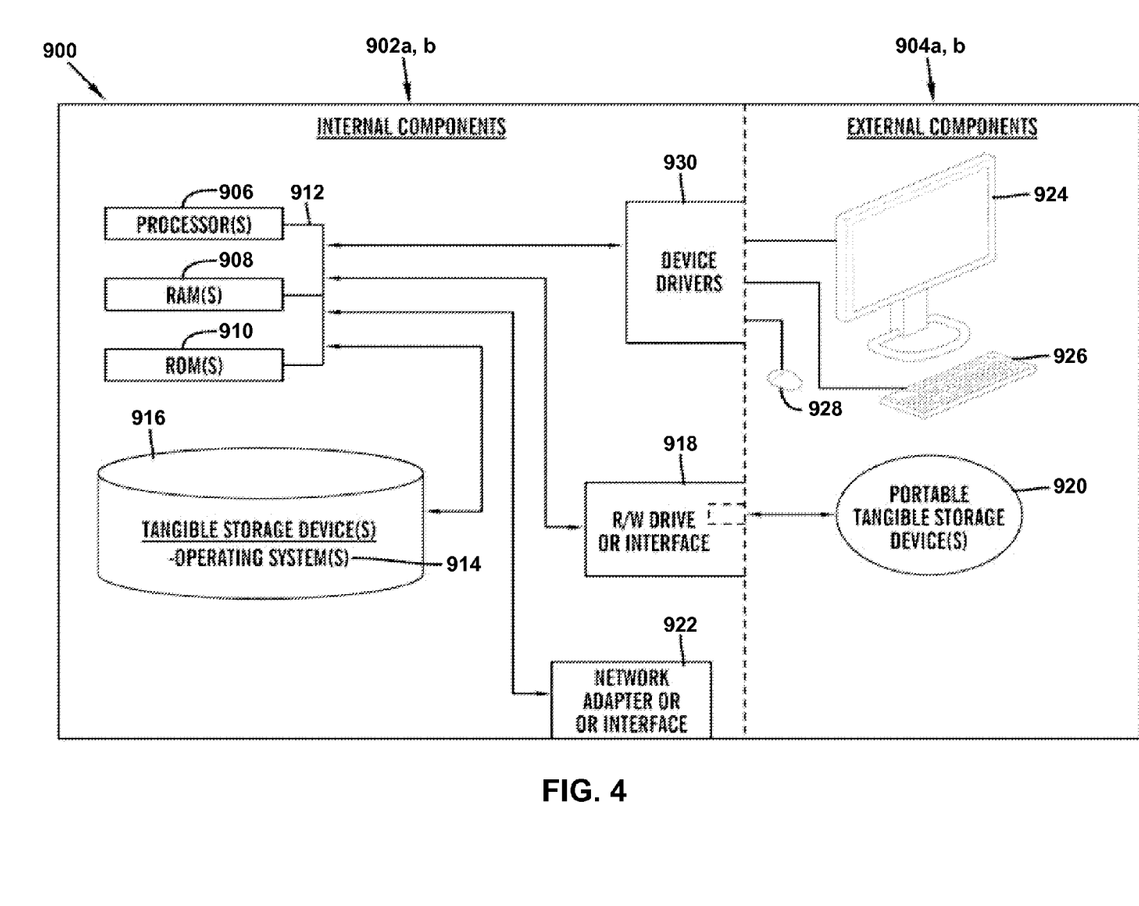
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the dynamic game program 110a (FIG. 1) in client computer 102 (FIG. 1) and the dynamic game program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the dynamic game program 110a and 110b (FIG. 1) can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the dynamic game program 110a (FIG. 1) in client computer 102 (FIG. 1) and the dynamic game program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the dynamic game program 110a (FIG. 1) in client computer 102 (FIG. 1) and the dynamic game program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
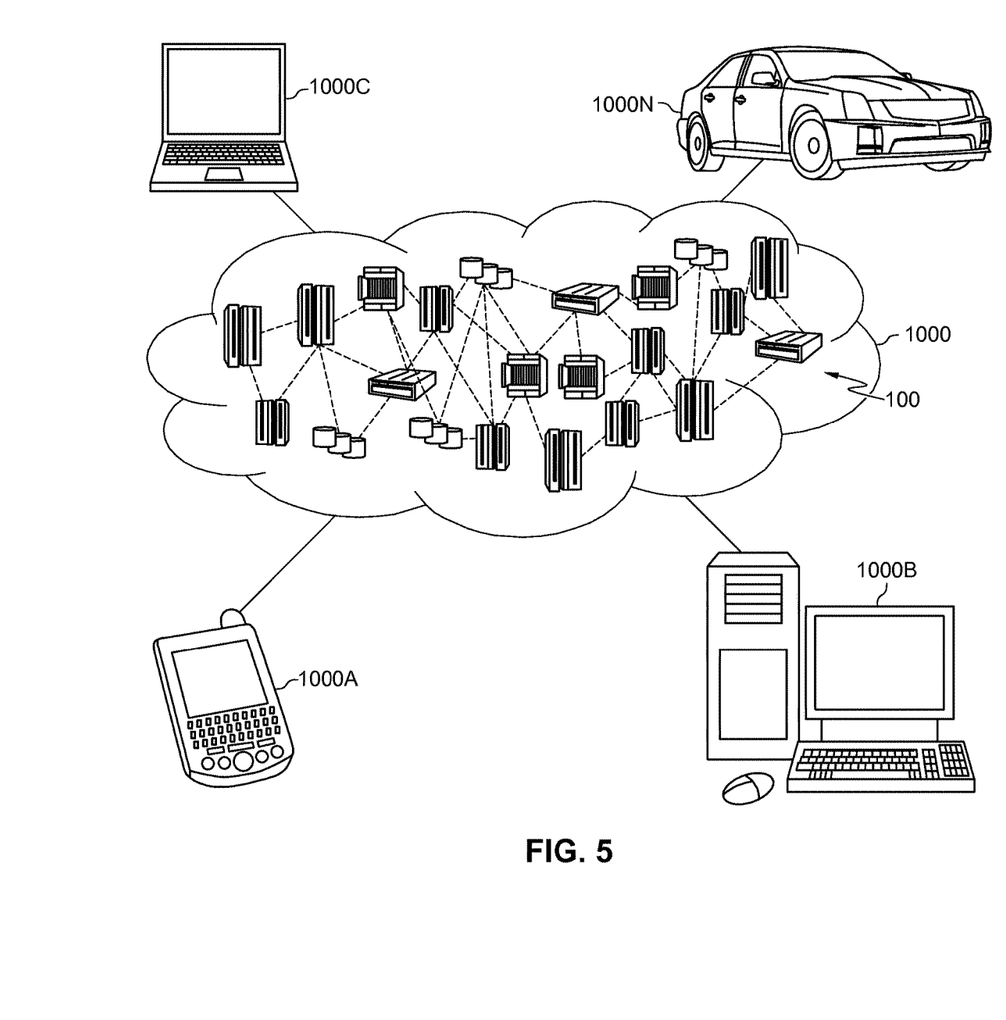
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
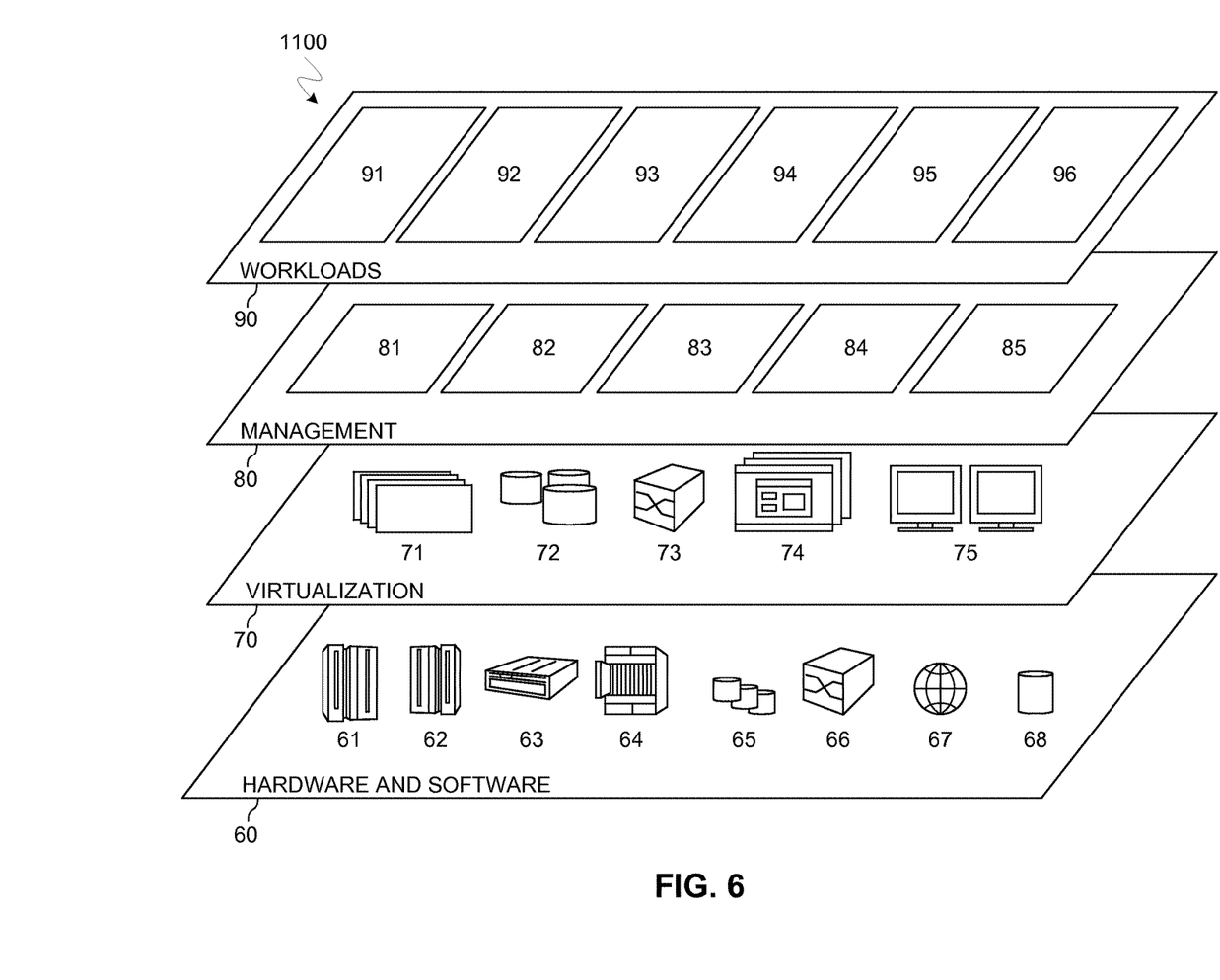
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic game 96. A dynamic game program 110a, 110b (FIG. 1) provides a way to present a dynamic game experience that may be location and contact-aware.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for personalizing a game executed by a processor of an electronic device based on a plurality of environmental objects in proximity to a user, the method comprising:
    collecting a plurality of user data;
    determining at least one output option connectively coupled to the electronic device;
    determining at least one available input sensor connectively coupled to the electronic device, wherein the at least one available input sensor collects a plurality of physical user state data;
    determining a current user location collected using a geographic location sensor connectively coupled to the electronic device;
    collecting a plurality of object data associated with the plurality of environmental objects in proximity to the current user location;
    selecting a game template from a plurality of available game templates based on the collected plurality of user data, the collected plurality of object data, the determined at least one available input sensor, and the determined at least one output option;
    configuring the electronic game based on the selected game template, the collected plurality of user data, the collected plurality of object data, the determined at least one available input sensor, and the determined at least one output option, wherein the configured electronic game directs the user to interact with the plurality of environmental objects for gameplay; and
    executing, by the processor, the configured electronic game, wherein executing the configured electronic game comprises:
        presenting, using the determined at least one output option, a game scenario based on the configured electronic game to the user;
        collecting, using the determined at least one available input sensor, the plurality of physical user state data; and
        altering the configured electronic game based on the collected plurality of user state data.

2. The method of claim 1, wherein collecting user data comprises at least one of receiving user-defined preferences from a user, mining data associated with the user, collecting real-time data associated with the user, and collecting location data related to the user.

3. The method of claim 1, further comprising:
    collecting a plurality of real-time data associated with a user based on the determined at least one available input sensor and the executing electronic game; and
    altering the configured electronic game based on the collected plurality of real-time data.

4. The method of claim 1, wherein configuring the electronic game based on the selected game template, the collected plurality of user data, the collected plurality of object data, the determined at least one available input sensor, and the determined at least one output option comprises configuring at least one of a content, a behavior, and a presentation associated with the electronic game.

5. The method of claim 1, wherein collecting the plurality of user data includes receiving a user fitness objective and receiving a plurality of user fitness preferences.

6. The method of claim 5, wherein selecting the game template from a plurality of available game templates based on the collected plurality of user data, the collected plurality of object data, the determined at least one available input sensor, and the determined at least one output option includes selecting the game template based on the received user fitness objective and the received plurality of user fitness preferences.

7. The method of claim 1, wherein executing the configured electronic game comprises executing the configured electronic game in response to a user-defined trigger event.

8. The method of claim 7, wherein the user-defined trigger event comprises at least one of a location, a time, a personal objective, and a fitness objective.

9. The method of claim 1, further comprising:
    sending a game result to a target destination based on the executing electronic game.

10. A computer system for personalizing a game executed by a processor of an electronic device based on a plurality of environmental objects in proximity to a user, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        collecting a plurality of user data;
        determining at least one output option connectively coupled to the electronic device;
        determining at least one available input sensor connectively coupled to the electronic device, wherein the at least one available input sensor collects a plurality of physical user state data;
        determining a current user location collected using a geographic location sensor connectively coupled to the electronic device;
        collecting a plurality of object data associated with the plurality of environmental objects in proximity to the current user location;
        selecting a game template from a plurality of available game templates based on the collected plurality of user data, the collected plurality of object data, the determined at least one available input sensor, and the determined at least one output option;
        configuring the electronic game based on the selected game template, the collected plurality of user data, the collected plurality of object data, the determined at least one available input sensor, and the determined at least one output option, wherein the configured electronic game directs the user to interact with the plurality of environmental objects for gameplay; and
        executing, by the processor, the configured electronic game, wherein executing the configured electronic game comprises:

presenting, using the determined at least one output option, a game scenario based on the configured electronic game to the user;

collecting, using the determined at least one available input sensor, the plurality of physical user state data; and altering the configured electronic game based on the collected plurality of user state data.

11. The computer system of claim 10, wherein collecting user data comprises at least one of receiving user-defined preferences from a user, mining data associated with the user, collecting real-time data associated with the user, and collecting location data related to the user.

12. The computer system of claim 10, further comprising:
collecting a plurality of real-time data associated with a user based on the determined at least one available input sensor and the executing electronic game; and
altering the configured electronic game based on the collected plurality of real-time data.

13. The computer system of claim 10, wherein configuring the electronic game based on the selected game template, the collected plurality of user data, the collected plurality of object data, the determined at least one available input sensor, and the determined at least one output option comprises configuring at least one of a content, a behavior, and a presentation associated with the electronic game.

14. The computer system of claim 10, wherein collecting the plurality of user data includes receiving a user fitness objective and receiving a plurality of user fitness preferences.

15. The computer system of claim 14, wherein selecting the game template from a plurality of available game templates based on the collected plurality of user data, the collected plurality of object data, the determined at least one available input sensor, and the determined at least one output option includes selecting the game template based on the received user fitness objective and the received plurality of user fitness preferences.

16. A non-transitory computer readable medium for personalizing a game, the non-transitory computer readable medium including a plurality of program instructions, which when executed by a processor of an electronic device based on a plurality of environmental objects in proximity to a user, cause the processor to:
collect a plurality of user data;
determine at least one output option connectively coupled to the electronic device;
determine at least one available input sensor connectively coupled to the electronic device, wherein the at least one available input sensor collects a plurality of physical user state data;
determine a current user location collected using a geographic location sensor connectively coupled to the electronic device;
collect a plurality of object data associated with the plurality of environmental objects in proximity to the current user location;
select a game template from a plurality of available game templates based on the collected plurality of user data, the collected plurality of object data, the determined at least one available input sensor, and the determined at least one output option;
configure the electronic game based on the selected game template, the collected plurality of user data, the collected plurality of object data, the determined at least one available input sensor, and the determined at least one output option, wherein the configured electronic game directs the user to interact with the plurality of environmental objects for gameplay; and
execute, by the processor, the configured electronic game, wherein executing the configured electronic game comprises:
presenting, using the determined at least one output option, a game scenario based on the configured electronic game to the user;
collecting, using the determined at least one available input sensor, the plurality of physical user state data; and
altering the configured electronic game based on the collected plurality of user state data.

17. The computer medium of claim 16, wherein collecting user data comprises at least one of receiving user-defined preferences from a user, mining data associated with the user, collecting real-time data associated with the user, and collecting location data related to the user.

18. The computer medium of claim 16, further comprising:
collect a plurality of real-time data associated with a user based on the determined at least one available input sensor and the executing electronic game; and
alter the configured electronic game based on the collected plurality of real-time data.

19. The computer medium of claim 16, wherein configuring the electronic game based on the selected game template, the collected plurality of user data, the collected plurality of object data, the determined at least one available input sensor, and the determined at least one output option comprises configuring at least one of a content, a behavior, and a presentation associated with the electronic game.

20. The computer medium of claim 16, wherein collecting the plurality of user data includes receiving a user fitness objective and receiving a plurality of user fitness preferences.

* * * * *